United States Patent
Zhang et al.

(10) Patent No.: US 10,984,215 B2
(45) Date of Patent: Apr. 20, 2021

(54) METHOD OF RECOGNIZING FINGERPRINT AND MOBILE TERMINAL

(71) Applicant: WUHAN CHINA STAR OPTOELECTRONICS TECHNOLOGY CO., LTD., Hubei (CN)

(72) Inventors: Zhou Zhang, Hubei (CN); Yucheng Tsai, Hubei (CN); Changwen Ma, Hubei (CN); Pan Xu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 31 days.

(21) Appl. No.: 16/492,170

(22) PCT Filed: May 10, 2019

(86) PCT No.: PCT/CN2019/086379
§ 371 (c)(1),
(2) Date: Sep. 9, 2019

(87) PCT Pub. No.: WO2020/191874
PCT Pub. Date: Oct. 1, 2020

(65) Prior Publication Data
US 2020/0311371 A1   Oct. 1, 2020

(51) Int. Cl.
*G06K 9/00* (2006.01)
*G06F 3/041* (2006.01)

(52) U.S. Cl.
CPC .......... *G06K 9/0004* (2013.01); *G06F 3/0412* (2013.01); *H04M 2250/22* (2013.01)

(58) Field of Classification Search
CPC .............. G06K 9/0004; G06K 9/00006; G06F 3/0412; G06F 3/0416; H04M 2250/22
See application file for complete search history.

(56) References Cited

U.S. PATENT DOCUMENTS

| | | | |
|---|---|---|---|
| 2013/0215049 A1* | 8/2013 | Lee | G06F 3/0446 345/173 |
| 2014/0285469 A1* | 9/2014 | Wright | G06F 1/3262 345/174 |

(Continued)

FOREIGN PATENT DOCUMENTS

| CN | 101719031 A | 6/2010 |
|---|---|---|
| CN | 106709405 A | 5/2017 |

(Continued)

*Primary Examiner* — Premal R Patel
(74) *Attorney, Agent, or Firm* — Mark M. Friedman

(57) ABSTRACT

A method of recognizing a fingerprint is implemented by dividing a sensor matrix of a mobile terminal into a plurality of blocks by rows. Each of the blocks is under control of an independent switch terminal. When performing fingerprint unlocking, only an area covered by the fingerprint is being scanned, while an area not covered by the fingerprint is not to be scanned, thereby significantly reducing a scanning area, shortening a scanning time, improving unlocking efficiency, fulfilling fast fingerprint unlocking, and reducing power consumption. A mobile terminal is also provided and includes a multiplexer configured to divide the sensor matrix into a plurality of blocks. Each of the blocks can independently perform fingerprint recognition scanning. When fingerprint unlocking is carried out, there is no need to scan an entire area of the sensor matrix, thereby improving unlocking efficiency and saving electric energy.

17 Claims, 5 Drawing Sheets

--- providing a mobile terminal comprising a fingerprint recognition system, wherein the fingerprint recognition system comprises a sensor matrix divided into n number of blocks by rows, wherein each of the blocks comprises a plurality of rows of the sensors of the sensor matrix and wherein n is an integer greater than one — S1 detecting the blocks covered by a fingerprint — S2 scanning the blocks covered by the fingerprint to recognized the fingerprint — S3

(56) References Cited

U.S. PATENT DOCUMENTS

| | | | | |
|---|---|---|---|---|
| 2014/0354556 A1* | 12/2014 | Alameh | ................. | G06F 3/041 |
| | | | | 345/173 |
| 2015/0309661 A1* | 10/2015 | Kim | ..................... | G06F 3/0443 |
| | | | | 345/174 |
| 2016/0171281 A1* | 6/2016 | Park | .................. | G06K 9/00087 |
| | | | | 382/124 |
| 2017/0140201 A1* | 5/2017 | Li | ........................... | G06F 3/041 |
| 2018/0157893 A1* | 6/2018 | Lee | .................... | G06K 9/00087 |
| 2019/0204969 A1* | 7/2019 | Jo | ........................ | G06F 3/0412 |
| 2020/0019744 A1* | 1/2020 | Kim | ...................... | G06T 7/0012 |
| 2020/0125817 A1* | 4/2020 | Kim | ..................... | G06K 9/0002 |
| 2020/0210668 A1* | 7/2020 | Jhang | .................... | G06F 3/0446 |
| 2020/0365108 A1* | 11/2020 | Morein | ............... | G09G 3/3677 |

FOREIGN PATENT DOCUMENTS

| | | | |
|---|---|---|---|
| CN | 106778616 A | 5/2017 | |
| CN | 106951884 A | 7/2017 | |
| CN | 107316033 A | 11/2017 | |
| CN | 107895143 A | 4/2018 | |
| CN | 108089767 A | 5/2018 | |

\* cited by examiner

METHOD OF RECOGNIZING FINGERPRINT AND MOBILE TERMINAL

BACKGROUND OF INVENTION

1. Field of Invention

The present invention relates to a technical field of electronics, and particularly to, a method of recognizing a fingerprint and a mobile terminal.

2. Related Art

With development of smart phone manufacturing technology and mobile phone unlocking technology, these days, fingerprint recognition unlocking has become a standard specification of mobile phones. At present, fingerprint recognition technology used on mobile phones generally includes capacitive fingerprint recognition technology, and optical fingerprint recognition technology and an ultrasonic fingerprint recognition technology emerging recently. But there is no exception, these fingerprint recognition technologies are implemented to recognize a fingerprint on specific portions of mobile phones. For example, home keys of mobile phones and partial areas of rear sides of mobile phones. A size of such a design of a fingerprint recognition area is approximately the same as that of a user's fingerprint, but a small-sized fingerprint recognition area is inconvenient for use.

Based on the above-mentioned problem, full-screen fingerprint unlocking technology has become the focus of research and promotion of major mobile phone manufacturers. However, based on conventional fingerprint recognition technology, the full-screen fingerprint unlocking technology fulfilled by simply enlarging a fingerprint recognition area gives rise to problems such as slow unlocking speed or high power consumption. Since conventional full-screen fingerprint unlocking technology is implemented by performing fingerprint recognition scanning on entire areas of screens of mobile phones, it takes more time and consumes more power in operation than fingerprint scanning on a partial area.

For mobile terminals using full-screen or large-sized area fingerprint recognition technology, conventional fingerprint recognition methods need to scan an entire area configured for fingerprint recognition, thereby resulting in a longer time and a large amount of power consumption in fingerprint recognition because of a larger scanning area.

SUMMARY OF INVENTION

To overcome the above-mentioned technical problem, the present application provides a solution as follows:

The present application provides a method of recognizing a fingerprint, adapted to a mobile terminal comprising a fingerprint recognition system, wherein the fingerprint recognition system comprises a sensor matrix being an N×M type matrix and comprising M number of sensors per row and N number of sensors per column, wherein N and M are integers greater than one, and wherein the method of recognizing the fingerprint comprises: dividing the sensor matrix into n number of blocks by rows, wherein each of the blocks comprises a plurality of rows of the sensors of the sensor matrix, and wherein n is an integer greater than one; detecting the blocks covered by a fingerprint; and scanning the blocks covered by the fingerprint to recognize the fingerprint.

In the method of recognizing the fingerprint, each of the n number of blocks comprises a same number of rows of the sensor matrix, so that N=k×n, wherein k is an integer greater than one.

In the method of recognizing the fingerprint, the fingerprint recognition system further comprises a multiplexer comprising n number of independent switch terminals, and the dividing the sensor matrix into n number of blocks by rows comprises: enabling, by using the multiplexer, each of the independent switch terminals of the multiplexer to control a predetermined number of rows of the sensors of the sensor matrix, wherein an area covered by the sensors under control of each of the independent switch terminals is defined as one of the blocks.

In the method of recognizing the fingerprint, the mobile terminal further comprises a touch screen disposed on the fingerprint recognition system.

In the method of recognizing the fingerprint, the touch screen is disposed above the sensor matrix.

In the method of recognizing the fingerprint, the touch screen comprises a positioning system, and the detecting the blocks covered by a fingerprint comprises: detecting, by using the positioning system, a coordinate position of the fingerprint on the touch screen; determining the sensors covered by the fingerprint according to the coordinate position; and determining the blocks covered by the fingerprint according to the sensors covered by the fingerprint.

In the method of recognizing the fingerprint, the fingerprint recognition system further comprises a scanning system, wherein the scanning system is coupled to the sensor matrix through the multiplexer to provide scanning signals to the sensor matrix.

In the method of recognizing the fingerprint, the scanning the blocks covered by the fingerprint to recognize the fingerprint comprises: turning on, by the multiplexer, the sensors of the blocks covered by the fingerprint; and recognizing, by scanning the sensors of the blocks covered by the fingerprint through the scanning system, the fingerprint.

In the method of recognizing the fingerprint, the blocks covered by the fingerprint comprises a first area and a second area, wherein the first area is defined as an area covered by the fingerprint, and the second area is defined as an area not covered by the fingerprint, and wherein the scanning the sensors of the blocks covered by the fingerprint through the scanning system comprises: performing a normal fingerprint scan on the sensors in the first area, and performing a fast fingerprint scan faster than the normal fingerprint scan on the sensors in the second area.

In the method of recognizing the fingerprint, a time taken for the normal fingerprint scan to complete scanning a row of the sensors is 50 microseconds, and a time taken for the fast fingerprint scan to complete scanning a row of the sensors is 5 microseconds.

In the method of recognizing the fingerprint, the scanning the sensors of the blocks covered by the fingerprint through the scanning system comprises: performing a normal fingerprint scan on the blocks covered by the fingerprint.

In the method of recognizing the fingerprint, a time taken for the normal fingerprint scan to complete scanning a row of the sensors is 50 microseconds.

The present application further comprises a mobile terminal, comprising a fingerprint recognition system, wherein the fingerprint recognition system comprises: a sensor matrix configured to recognize a fingerprint, wherein the sensor matrix is an N×M type matrix and comprises M number of sensors per row and N number of sensors per column, and wherein N and M are integers greater than one;

a multiplexer comprising n number of independent switch terminals, wherein the n number of independent switch terminals are configured to divide the sensor matrix into n number of blocks by rows, and each of the blocks is controlled by one of the switch terminals, wherein n is an integer greater than one; and a scanning system configured to provide scanning signals to the blocks through the switch terminals to recognize the fingerprint; wherein each of the switch terminals operates in two modes including a turn-on mode and a turn-off mode, and the scanning system is configured to provide the scanning signals to the blocks through the switch terminals operating in the turn-on mode to recognize the fingerprint.

In the mobile terminal of the present application, the mobile terminal further comprises a touch screen disposed on the fingerprint recognition system, wherein the touch screen comprises a positioning system configured to detect a coordinate position of the fingerprint on the touch screen.

In the mobile terminal of the present application, the touch screen is disposed above the sensor matrix.

In the mobile terminal of the present application, the multiplexer is configured to control corresponding switch terminals operating in the turn-on mode according to the coordinate position of the fingerprint on the touch screen.

In the mobile terminal of the present application, each of the n number of blocks comprises a same number of rows of the sensors.

In the mobile terminal of the present application, some of the n number of blocks each comprise a same number of rows of the sensors.

Based on the mobile terminal provided by the embodiment of the present application, the sensor matrix is divided into a plurality of blocks by rows, and each of the blocks is under control of an independent switch terminal. When performing fingerprint recognition scanning, only an area covered by the fingerprint is being scanned, while an area not covered by the fingerprint is not to be scanned, thereby significantly reducing a scanning area, shortening a scanning time, and reducing power consumption.

BRIEF DESCRIPTION OF DRAWINGS

To better illustrate embodiments or technical solutions in the prior art, a brief description of the drawings used in the embodiments or the prior art description will be given below. Obviously, the accompanying drawings in the following description merely show some embodiments of the present invention, and a person skilled in the art may still derive other drawings from these accompanying drawings without creative efforts.

DESCRIPTION OF PREFERRED EMBODIMENTS

Figure 1:
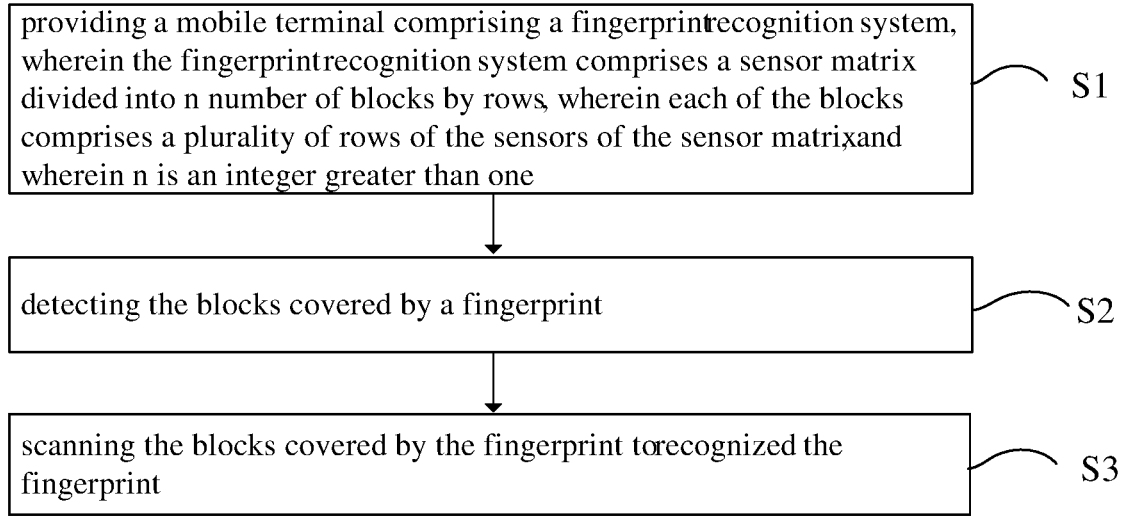
FIG. 1 is a flowchart showing a large area fingerprint recognition method of an embodiment of the present application.
Figure 2:
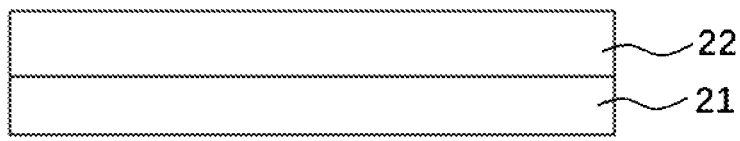
FIG. 2 is a schematic structural view of a mobile terminal of an embodiment of the present application.

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are aimed to describe and understand the present invention, but the present invention is not limited thereto. The same reference numerals in the drawings denote the same parts.

A method of recognizing a fingerprint is provided in embodiments of the present application. The fingerprint recognition method is implemented by dividing a sensor matrix into a plurality of blocks by rows, wherein each of the blocks is under control of an independent switch port, so that a fingerprint recognition scanning can be performed independently by each of the blocks. In operation, fingerprint scanning is performed only on an area covered by the fingerprint, while an area not covered by the fingerprint is not to be scanned, thereby reducing a fingerprint recognition area, a time of recognizing the fingerprint, as well as power consumption.

A method of recognizing a fingerprint provided by the embodiment of the present application is described in detail below with reference to the accompanying drawings:

As shown in FIGS. 1-4, FIG. 1 is a flowchart showing a method of recognizing a fingerprint in accordance with an embodiment of the present application. The method of recognizing the fingerprint is adapted to a mobile terminal 20. The mobile terminal 20 includes a fingerprint recognition system 21 including a sensor matrix 210 being an N×M type matrix. The sensor matrix 210 includes M number of sensors C per row and N number of sensors C per column, wherein N and M are integers greater than one.

In one embodiment of the present application, the mobile terminal 20 further includes a touch screen 22 disposed on the fingerprint recognition system 21. Specifically, the touch screen 22 is disposed above the sensor matrix 210.

Figure 3:
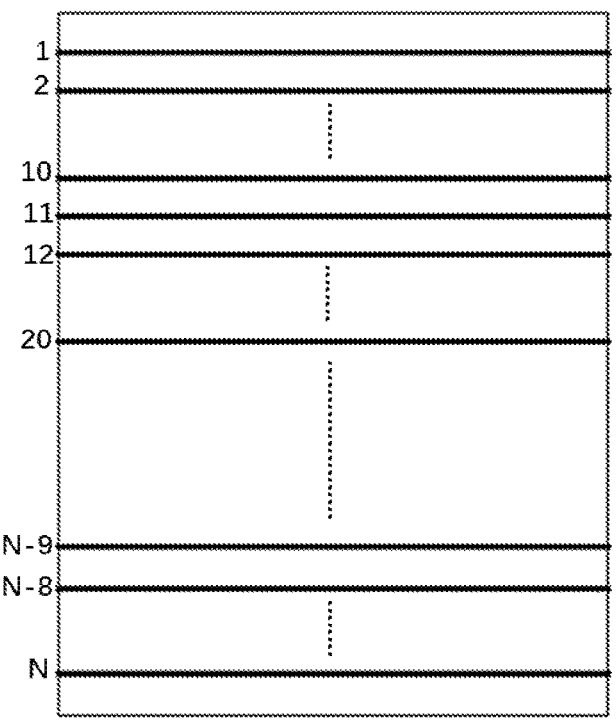
FIG. 3 is a schematic structural view of a sensor matrix of an embodiment of the present application.
Figure 4:
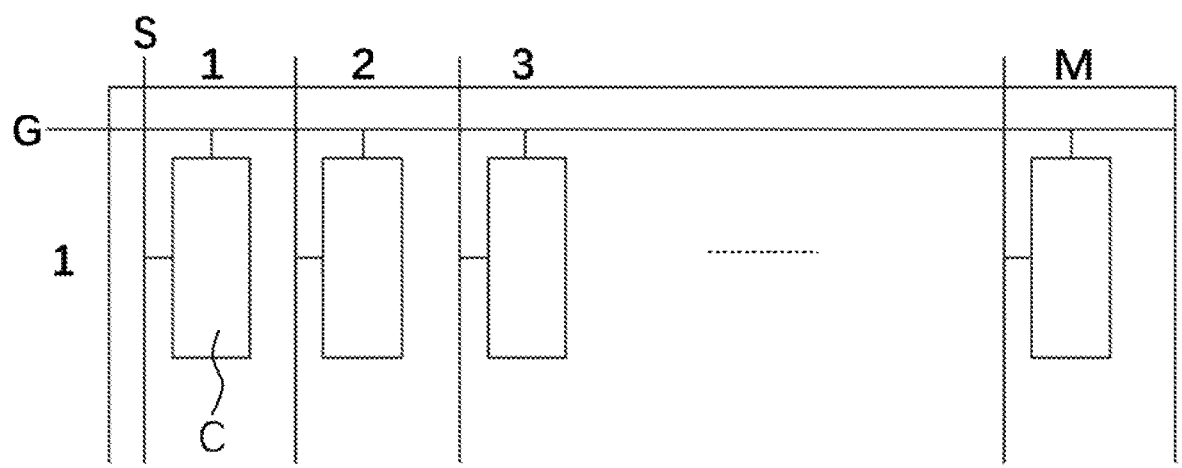
FIG. 4 is a schematic structural view showing a first row of sensors of the sensor matrix of FIG. 3.

The sensor matrix 210 of the embodiment of the present application is composed of N number of rows of sensors C and M number of columns of sensors C. FIG. 3 shows an overall structure of the sensor matrix 210. Each of the sensors C in the sensor matrix 210 is connected to an external circuit through two interfaces. One of the two interfaces is connected to scanning lines G and is thus further coupled to an external scanning system. The other interface is connected to data lines S and is thus connected to an external data processing unit. Although the sensors C are not directly shown in FIG. 3, an arrangement of the sensors C in each row is shown in FIG. 4. FIG. 3 is a schematic view showing an overall structure of the sensor matrix 210.

A method of recognizing a fingerprint provided by an embodiment of the present application includes steps as follows:

Step S1: dividing the sensor matrix into n number of blocks by rows, wherein each of the blocks includes a plurality of rows of the sensors of the sensor matrix, and wherein n is an integer greater than one.

Figure 5:
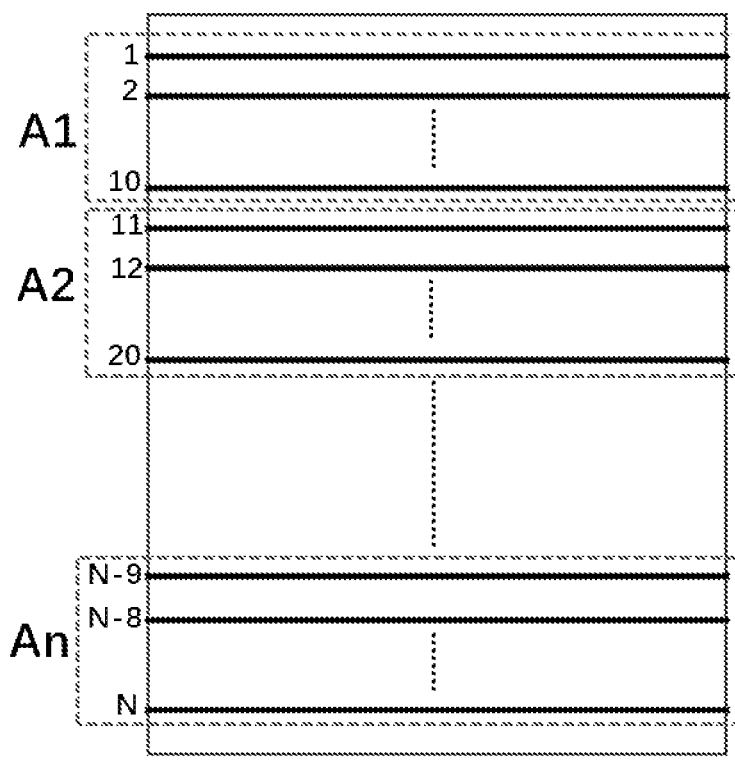
FIG. 5 is a schematic view showing a sensor matrix divided into a plurality of blocks by rows in accordance with an embodiment of the present application.

In one embodiment of the present application, referring to FIGS. 3-5, the sensor matrix 210 is an N×M type matrix. That is, the sensor matrix 210 includes M number of sensors per row and N number of sensors per column. The N number rows of sensors are equally divided into n number of blocks. Each of the blocks includes 10 rows of the sensors. That is, a first to tenth rows of the sensors of the sensor matrix 210 are defined as a block A1, a $11^{th}$ to $20^{th}$ rows of the sensors of the sensor matrix 210 are defined as a block A2, and so on. In other words, in this embodiment a number of the sensors of the sensor matrix 210 is equal to N=10×n.

It should be understood that although in one embodiment of the present application, the sensors in the sensor matrix 210 are equally divided by every 10 rows, in other words, each of the blocks includes 10 rows of the sensors in the sensor matrix 210, but is not limited to this method of dividing blocks. According to the same idea, the sensor matrix 210 can be equally divided by every k number of rows, wherein k is an integer greater than one. That is, each of the blocks includes k rows of the sensors of the sensor matrix 210, wherein a number of the sensors of the sensor matrix 210 is equal to N=k×n.

Likewise, although in one embodiment of the present application, the sensors in the sensor matrix 210 are equally divided into n number of the sensors by every k number of rows, the sensor matrix 210 can also be unequally divided or partially divided. For example, the sensor matrix 210 is divided by rows into n number of blocks each including different rows or the same rows of the sensors. The present application is directed to dividing the sensor matrix 210 into different number of blocks by rows, but not to limit number of rows of the sensors included in each of the blocks.

Figure 6:
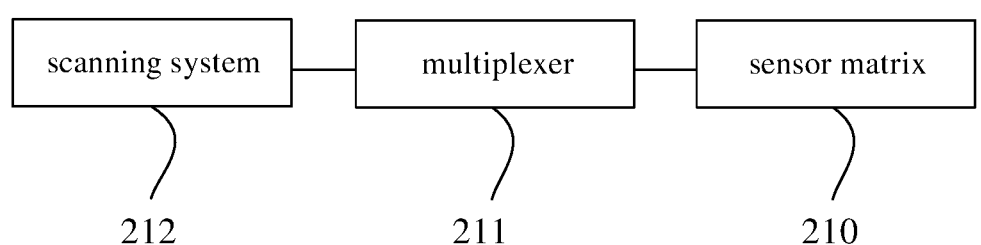
FIG. 6 is a schematic structural view of a fingerprint recognition system of an embodiment of the present application.

In one embodiment of the present application as shown in FIG. 6, the fingerprint recognition system 21 further includes a multiplexer 211. The multiplexer 211 includes n number of mutually independent switch terminals. The n number of independent switch terminals of the multiplexer 211 are each configured to control n number of blocks of the sensor matrix 210. That is, each of the n number of blocks of the sensor matrix 210 can be individually turned on or off. When fingerprinting scanning is performed, only part of the blocks is turn-on for fingerprint scanning, and the remaining blocks remain turn-off, thereby reducing number of the sensors that need to be scanned during a fingerprint recognition scan, and reducing a scanning time as well as power consumption.

Step S2: detecting the blocks covered by a fingerprint.

In one embodiment of the present application, the mobile terminal 20 further includes a touch screen 22 disposed on the fingerprint recognition system 21. The fingerprint recognition system 21 includes a sensor matrix. Specifically, the touch screen 22 is disposed above the sensor matrix 210. The touch screen 22 includes a positioning system. The positioning system is configured to detect a coordinate position of a fingerprint on the touch screen 22. Step S2 specifically includes steps as follows:

Detecting a coordinate position of the fingerprint on the touch screen 22 by using the positioning system. For example, establish a plane coordinate system on a surface of the touch screen 22, set a horizontal axis (or X axis) of the coordinate system along a horizontal border of the touch screen 22, and set a vertical axis (or Y axis) of the coordinate system along a vertical border of the touch screen 22. When performing fingerprint position detection, the positioning system may detect a coordinate point of a fingerprint on the coordinate system, thereby to position a coordinate position of the fingerprint on the touch screen 22.

Determine the sensors covered by the fingerprint according to the coordinate position. Specifically, the positioning system is configured to project the coordinate position to the sensor matrix 210 to determine the sensor corresponding to a fingerprint location.

Determine the blocks covered by the fingerprint according to the sensors covered by the fingerprint.

It should be noted that "the sensors covered by the fingerprint" or "the blocks covered by the fingerprint" described in the present application is referring to the sensors or the blocks totally or partially covered by the fingerprint with the fingerprint projection to the sensor matrix 210.

Step S3: scanning the blocks covered by the fingerprint to recognize the fingerprint.

In one embodiment of the present application as shown in FIG. 6, the fingerprint recognition system 21 further includes a scanning system 212, wherein the scanning system 212 is coupled to the sensor matrix 210 through the multiplexer 211. The scanning system 212 is configured to provide scanning signals to the sensor matrix 210 through the scanning lines G as shown in FIG. 4. The scanning signals transmitted by the scanning system 212 first pass through the switch terminals of the multiplexer 211, and are further distributed to corresponding blocks in the sensor matrix 210. Step S3 specifically includes steps as follows:

Turning on the sensors of the blocks covered by the fingerprint by the multiplexer 211. Specifically, the multiplexer 211 turns on switch terminals controlling the blocks covered by the fingerprint according to the blocks covered by the fingerprint, so that the scanning system 212 is electrically connected to the blocks covered by the fingerprint through the switch terminals.

Scan the sensors of the blocks covered by the fingerprint through the scanning system 212 to recognize the fingerprint. Specifically, the scanning system 212 provides scanning signals to enable fingerprint recognition scanning performed on the blocks covered by the fingerprint through the switch terminals of the multiplexer 211. It should be noted that each of the switch terminals operates in two modes including a turn-on mode and a turn-off mode. The scanning system 212 is configured to scan only the blocks corresponding to the switch terminals operating in the turn-on mode, so that there is no need to scan an entire area of the sensor matrix 210, thereby reducing a scanning range, improving scanning efficiency, and fulfilling quick recognition unlocking for a large area fingerprint recognition system.

Figure 7:
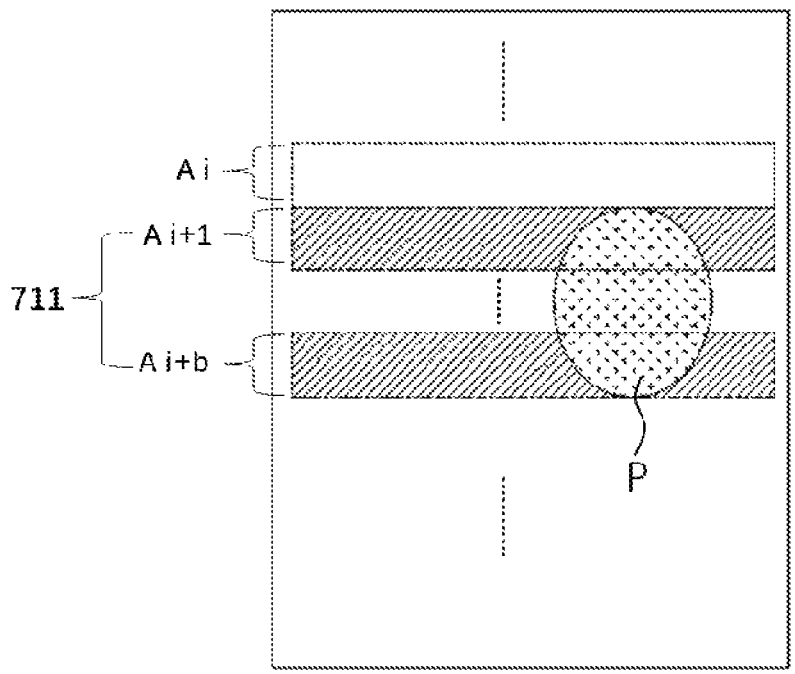
FIG. 7 is a schematic structural view showing a sensor matrix in a state of recognizing a fingerprint in accordance with an embodiment of the present application.

In one embodiment of the present application, as shown in FIG. 7, the sensor matrix 710 includes a plurality of the blocks. The blocks covered by a fingerprint P on the sensor matrix 710 are all the blocks from a block A i+1 to a block A i+b, wherein i and b are positive integers, and the fingerprint P covers all the blocks between A i+1 and A i+b.

A range between the block A i+1 and the block A i+b is defined as a fingerprint recognition area 711, wherein a normal fingerprint scan is performed on the fingerprint recognition area 711. Specifically, please refer to FIG. 6. The multiplexer 211 turns on the switch terminals corresponding to the fingerprint recognition area 711. The scanning system 212 sequentially scans the fingerprint recognition area 711 from top to bottom, and does not scan areas other than the fingerprint recognition area 711, thereby reducing a scanning range, shortening a fingerprint recognition time, and fulfilling quick fingerprint unlocking.

Specifically, a time taken for the normal fingerprint scan to complete scanning a row of the sensors is 50 microseconds.

Figure 8:
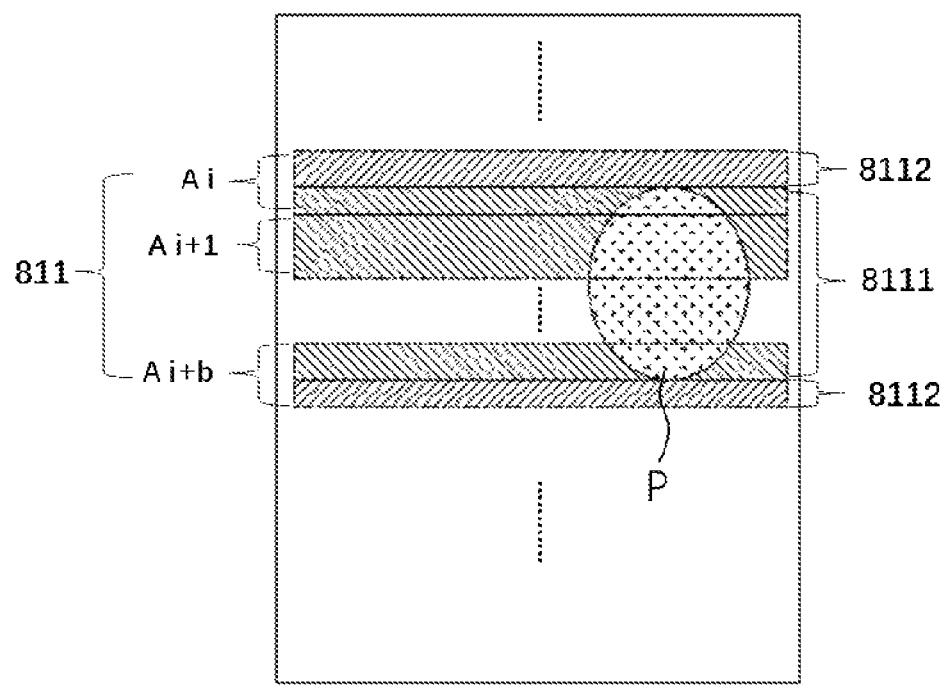
FIG. 8 is a schematic structural view showing a sensor matrix in a state of recognizing a fingerprint in accordance with another embodiment of the present application.

According to another embodiment of the present invention, as shown in FIG. 8, the sensor matrix 810 includes a plurality of the blocks. The blocks covered by a fingerprint P on the sensor matrix 810 are all the blocks from A i to A i+b, wherein i and b are positive integers. A range between the block A i+1 and the block A i+b (including the block A i and the block A i+b) is defined as a fingerprint recognition area 811. The fingerprint P partially covers the block A i and the block A i+b, wherein a second area 8112 is defined as an area not covered by the fingerprint P, an area other than the second area 8112 in the fingerprint recognition area 811 is defined as a first area 8111. Perform a normal fingerprint scan on the first area 8111, and performing a fast fingerprint scan on the second area 8112. A scanning speed of the fast fingerprint scanning is greater than that of the normal fingerprint scanning, thereby shortening a time for scanning the fingerprint recognition area 811, and ensuring accuracy of recognizing the fingerprint.

Specifically, please refer to FIG. 6. The multiplexer 211 turns on the switch terminals corresponding to the fingerprint recognition area 811. The scanning system 212 sequentially scans the fingerprint recognition area 811 from top to bottom. The scanning system 212 provides fast scanning signals to the second area 8112 to enable the fast fingerprint scan, and provides normal scanning signals to the first area 8111 to enable the normal fingerprint scan. Particularly, switching between the normal fingerprint scan and the fast fingerprint scan is controlled by an external processor. The external processor determines where the first area 8111 and the second area 8112 are located according to the fingerprint recognition system 21, thereby to control the scanning system 212 to provide the fast scanning signals to the second area 8112, and the normal scanning signals to the first area 8111.

Specifically, a time taken for the fast fingerprint scan to complete scanning a row of the sensors is 5 microseconds. A time taken for the normal fingerprint scan to complete scanning a row of the sensors is 50 microseconds.

The scanning system of the present application does not perform fingerprint recognition scan on areas other than the fingerprint recognition area 811, but performs the normal fingerprint scan on the first area 8111, an performs the fast fingerprint scan on the second 8112, thereby reducing a scanning range, shortening a fingerprint recognition time, and fulfilling quick fingerprint unlocking.

Figure 9:
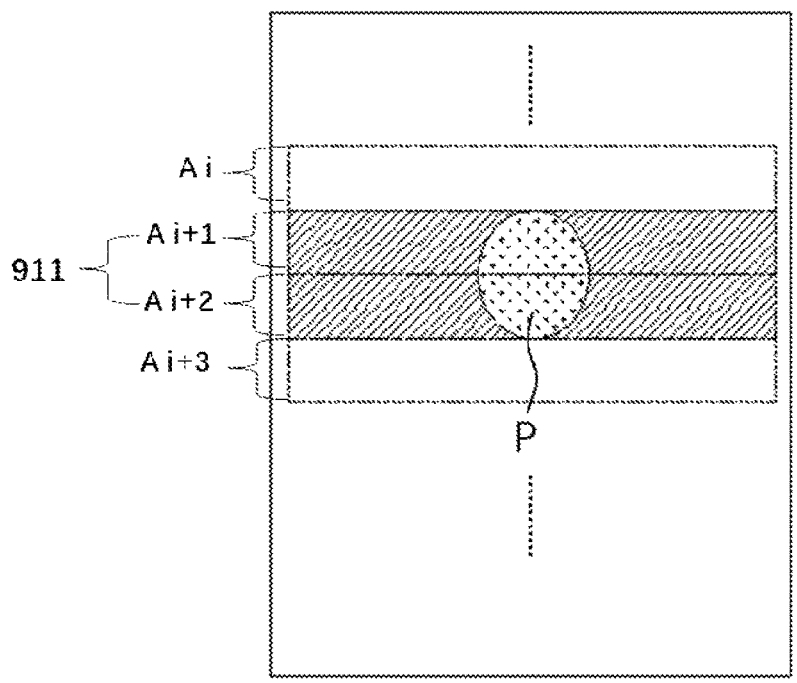
FIG. 9 is a schematic structural view showing a sensor matrix in a state of recognizing a fingerprint in accordance with another embodiment of the present application.

According to another embodiment of the present invention, as shown in FIG. 9, the sensor matrix 910 includes a plurality of the blocks. The blocks covered by a fingerprint P on the sensor matrix 910 are a block A i+1 and a block A i+2. That is, the fingerprint P covers the two blocks, and the block A i+1 and the block A i+2 are completely covered by the fingerprint P.

The block A i+1 and the block A i+2 are defined as a fingerprint recognition area 911, wherein a normal fingerprint scan is performed on the fingerprint recognition area 911. Specifically, please refer to FIG. 6. The multiplexer 211 turns on the switch terminals corresponding to the fingerprint recognition area 911. The scanning system 212 sequentially scans the fingerprint recognition area 911 from top to bottom, and does not scan areas other than the fingerprint recognition area 911, thereby reducing a scanning range, shortening a fingerprint recognition time, and fulfilling quick fingerprint unlocking.

Specifically, a time taken for the normal fingerprint scan to complete scanning a row of the sensors is 50 microseconds.

Figure 10:
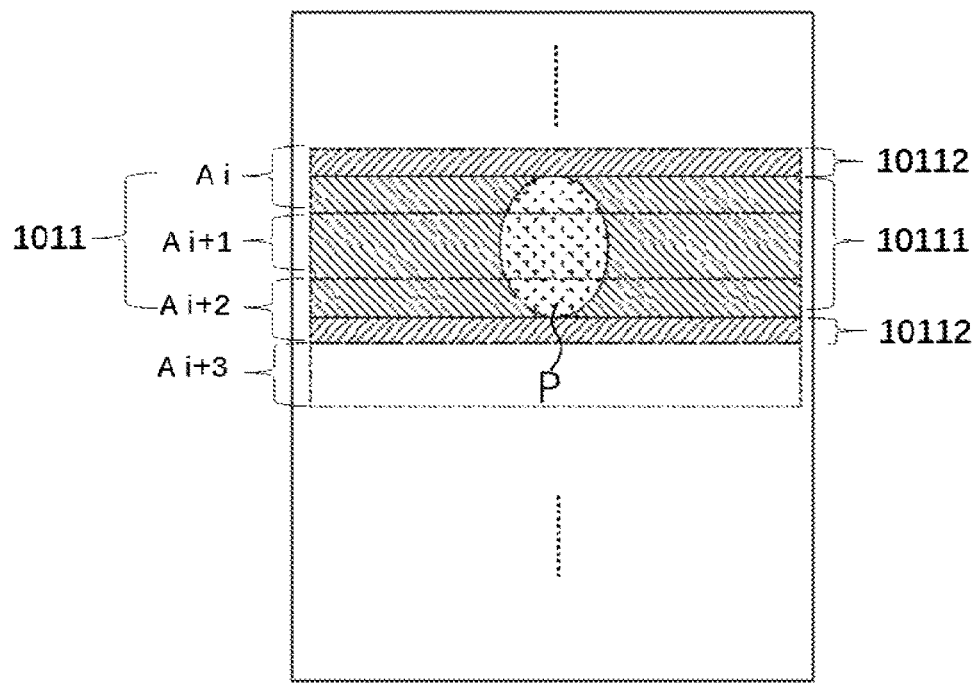
FIG. 10 is a schematic structural view showing a sensor matrix in a state of recognizing a fingerprint in accordance with another embodiment of the present application.

According to another embodiment of the present invention, as shown in FIG. 10, the sensor matrix 1010 includes a plurality of the blocks. The blocks covered by a fingerprint P on the sensor matrix 1010 are a block A i, a block A i+1 and a block A i+2, wherein the block A i, the block A i+1 and the block A i+2 are defined as a fingerprint recognition area 1011. The fingerprint P partially covers the block A i and the block A i+2. Areas in the block A i and the block A i+2 not covered by the fingerprint P are defined as a second area 10112. Areas in the block A i, the block A i+1, and the block A i+2 covered by the fingerprint P are defined as a first area 10111. A normal fingerprint scan is performed on the first area 10111, and a fast fingerprint scan is performed on the second area 10112. A scanning speed of the fast fingerprint scanning is greater than that of the normal fingerprint scanning, thereby shortening a time for scanning the fingerprint recognition area 1011, and ensuring accuracy of recognizing the fingerprint.

Specifically, please refer to FIG. 6. The multiplexer 211 turns on the switch terminals corresponding to the fingerprint recognition area 1011. The scanning system 212 sequentially scans the fingerprint recognition area 1011 from top to bottom. The scanning system 212 provides fast scanning signals to the second area 10112 to enable the fast fingerprint scan, and provides normal scanning signals to the first area 10111 to enable the normal fingerprint scan. Particularly, switching between the normal fingerprint scan and the fast fingerprint scan is controlled by an external processor. The external processor determines where the first area 10111 and the second area 10112 are located according to the fingerprint recognition system 21, thereby to control the scanning system 212 to provide the fast scanning signals to the second area 10112, and the normal scanning signals to the first area 10111.

Specifically, a time taken for the fast fingerprint scan to complete scanning a row of the sensors is 5 microseconds. A time taken for the normal fingerprint scan to complete scanning a row of the sensors is 50 microseconds.

The scanning system of the present application does not perform fingerprint recognition scan on areas other than the fingerprint recognition area 1011, but performs the normal fingerprint scan on the first area 10111, and performs the fast fingerprint scan on the second 10112, thereby reducing a scanning range, shortening a fingerprint recognition time, and fulfilling quick fingerprint unlocking.

The present application further provides a mobile terminal 20, as shown in FIG. 2 to FIG. 6, the mobile terminal 20 includes a fingerprint recognition system 21, wherein the fingerprint recognition system 20 includes a sensor matrix 210, a multiplexer 211, and a scanning system 212.

The sensor matrix 210 is an N×M type matrix. The sensor matrix 210 includes M number of sensors C per row and N number of sensors C per column, wherein N and M are integers greater than one. FIG. 3 shows an overall structure of the sensor matrix 210. FIG. 4 is a schematic structural view showing a first row of sensors of the sensor matrix of FIG. 3. Each of the sensors C in the sensor matrix 210 is connected to an external circuit through two interfaces. One of the two interfaces is connected to scanning lines G and is thus further coupled to an external scanning system. The other interface is connected to data lines S and is thus connected to an external data processing unit. Although the sensors C are not directly shown in FIG. 3, an arrangement of the sensors C in each row is shown in FIG. 4. FIG. 3 is a schematic view showing an overall structure of the sensor matrix 210.

The multiplexer 211 includes n number of mutually independent switch terminals. The n number of independent switch terminals are configured to divide the sensor matrix 210 into n number of blocks by rows, and each of the blocks is controlled by one of the switch terminals. That is, each of the n number of blocks of the sensor matrix 210 can be individually turned on or off. When fingerprinting scanning is performed, only part of the blocks is turn-on for fingerprint scanning, and the remaining blocks remain turn-off, thereby reducing an area of a fingerprint scanning area, and shortening a fingerprint recognition time, wherein n is an integer greater than one.

FIG. 5 shows a method of dividing blocks according to an embodiment of the present application. Each of the blocks includes 10 rows of the sensors. That is, a first to tenth rows of the sensors of the sensor matrix 210 are defined as a block A1, a $11^{th}$ to $20^{th}$ rows of the sensors of the sensor matrix 210 are defined as a block A2, and so on. The sensors from the $N-9^{th}$ to $N^{th}$ rows in the sensor matrix 210 are designated as a block An.

It should be understood that although in one embodiment of the present application, the sensors in the sensor matrix 210 are equally divided by every 10 rows. In other words, each of the blocks includes 10 rows of the sensors in the sensor matrix 210, but is not limited to this method of dividing blocks. According to the same idea, the sensor matrix 210 can be equally divided by every k number of rows, wherein k is an integer greater than one. That is, each of the blocks includes k rows of the sensors in the sensor matrix 210.

Likewise, although in one embodiment of the present application, the sensors in the sensor matrix 210 are equally divided into n number of the sensors by every k number of rows, the sensor matrix 210 can also be unequally divided or partially divided. For example, the sensor matrix 210 is divided by rows into n number of blocks each including different rows or the same rows of the sensors. The present application is directed to dividing the sensor matrix 210 into different number of blocks by rows, but not to limit number of rows of the sensors included in each of the blocks.

The scanning system 212 is coupled to the sensor matrix 210 through the multiplexer 211. The scanning system 212 is configured to provide scanning signals to the sensor matrix 210 through the scanning lines G. The scanning signals transmitted by the scanning system 212 first pass through the switch terminals of the multiplexer 211, and are further distributed to corresponding blocks in the sensor matrix 210 to scan the blocks. It should be noted that each of the switch terminals operates in two modes including a turn-on mode and a turn-off mode. The scanning system 212 is configured to scan only the blocks corresponding to the switch terminals operating in the turn-on mode, so that there is no need to scan an entire area of the sensor matrix 210, thereby reducing a scanning range, improving scanning efficiency, and fulfilling quick recognition unlocking for a large area fingerprint recognition system.

In one embodiment of the present application, the mobile terminal 20 further includes a touch screen 22 disposed on the fingerprint recognition system 21. Specifically, the touch screen 22 is disposed above the sensor matrix 210. The touch screen 22 includes a positioning system. The positioning system is configured to detect a coordinate position of a fingerprint on the touch screen 22. The multiplexer 211 is configured to control corresponding switch terminals operating in the turn-on mode according to the coordinate position of the fingerprint on the touch screen, thereby to perform the fingerprint recognition scan on the blocks of the sensor matrix 210 corresponding to the coordinate position of the fingerprint.

Based on the mobile terminal provided by the embodiment of the present application, the sensor matrix 210 is divided into a plurality of blocks by rows, and each of the blocks is under control of an independent switch terminal. When performing fingerprint recognition scanning, only an area covered by the fingerprint is being scanned, while an area not covered by the fingerprint is not to be scanned, thereby significantly reducing a scanning area, shortening a scanning time, and reducing power consumption.

Accordingly, although the present invention has been disclosed as a preferred embodiment, it is not intended to limit the present invention. Those skilled in the art without departing from the spirit and scope of the present invention may make various changes or modifications, and thus the scope of the present invention should be after the appended claims and their equivalents.

What is claimed is:

1. A method of recognizing a fingerprint, adapted to a mobile terminal comprising a fingerprint recognition system, wherein the fingerprint recognition system comprises a sensor matrix being an N×M type matrix and comprising M number of sensors per row and N number of sensors per column and further comprising a multiplexer comprising n number of independent switch terminals, wherein N and M are integers greater than one, and wherein the method of recognizing the fingerprint comprises:
   dividing the sensor matrix into n number of blocks by rows comprising:
      enabling, by using the multiplexer, each of the independent switch terminals of the multiplexer to control a predetermined number of rows of the sensors of the sensor matrix, wherein an area covered by the sensors under control of each of the independent switch terminals is defined as one of the blocks, wherein each of the blocks comprises a plurality of rows of the sensors of the sensor matrix, and wherein n is an integer greater than one;
   detecting the blocks covered by a fingerprint; and
   scanning the blocks covered by the fingerprint to recognize the fingerprint.

2. The method of recognizing the fingerprint of claim 1, wherein each of the n number of blocks comprises a same number of rows of the sensor matrix, so that N=k×n, wherein k is an integer greater than one.

3. The method of recognizing the fingerprint of claim 1, wherein the mobile terminal further comprises a touch screen disposed on the fingerprint recognition system.

4. The method of recognizing the fingerprint of claim 3, wherein the touch screen is disposed above the sensor matrix.

5. The method of recognizing the fingerprint of claim 4, wherein the touch screen comprises a positioning system, and the detecting the blocks covered by a fingerprint comprises:
   detecting, by using the positioning system, a coordinate position of the fingerprint on the touch screen;

determining the sensors covered by the fingerprint according to the coordinate position; and determining the blocks covered by the fingerprint according to the sensors covered by the fingerprint.

6. The method of recognizing the fingerprint of claim 5, wherein the fingerprint recognition system further comprises a scanning system, wherein the scanning system is coupled to the sensor matrix through the multiplexer to provide scanning signals to the sensor matrix.

7. The method of recognizing the fingerprint of claim 6, wherein the scanning the blocks covered by the fingerprint to recognize the fingerprint comprises:

turning on, by the multiplexer, the sensors of the blocks covered by the fingerprint; and recognizing, by scanning the sensors of the blocks covered by the fingerprint through the scanning system, the fingerprint.

8. The method of recognizing the fingerprint of claim 7, wherein the blocks covered by the fingerprint comprises a first area and a second area, wherein the first area is defined as an area covered by the fingerprint, and the second area is defined as an area not covered by the fingerprint, and wherein the scanning the sensors of the blocks covered by the fingerprint through the scanning system comprises:

performing a normal fingerprint scan on the sensors in the first area, and performing a fast fingerprint scan faster than the normal fingerprint scan on the sensors in the second area.

9. The method of recognizing the fingerprint of claim 8, wherein a time taken for the normal fingerprint scan to complete scanning a row of the sensors is 50 microseconds, and a time taken for the fast fingerprint scan to complete scanning a row of the sensors is 5 microseconds.

10. The method of recognizing the fingerprint of claim 8, wherein the scanning the sensors of the blocks covered by the fingerprint through the scanning system comprises:

performing a normal fingerprint scan on the blocks covered by the fingerprint.

11. The method of recognizing the fingerprint of claim 10, wherein a time taken for the normal fingerprint scan to complete scanning a row of the sensors is 50 microseconds.

12. A mobile terminal, comprising a fingerprint recognition system, wherein the fingerprint recognition system comprises:

a sensor matrix configured to recognize a fingerprint, wherein the sensor matrix is an N×M type matrix and comprises M number of sensors per row and N number of sensors per column, and wherein N and M are integers greater than one;

a multiplexer comprising n number of independent switch terminals, wherein the n number of independent switch terminals are configured to divide the sensor matrix into n number of blocks by rows, and each of the blocks is controlled by one of the switch terminals, wherein n is an integer greater than one; and a scanning system configured to provide scanning signals to the blocks through the switch terminals to recognize the fingerprint;

wherein each of the switch terminals operates in two modes including a turn-on mode and a turn-off mode, and the scanning system is configured to provide the scanning signals to the blocks through the switch terminals operating in the turn-on mode to recognize the fingerprint.

13. The mobile terminal of claim 12, wherein the mobile terminal further comprises a touch screen disposed on the fingerprint recognition system, wherein the touch screen comprises a positioning system configured to detect a coordinate position of the fingerprint on the touch screen.

14. The mobile terminal of claim 13, wherein the touch screen is disposed above the sensor matrix.

15. The mobile terminal of claim 14, wherein the multiplexer is configured to control corresponding switch terminals operating in the turn-on mode according to the coordinate position of the fingerprint on the touch screen.

16. The mobile terminal of claim 12, wherein each of the n number of blocks comprises a same number of rows of the sensors.

17. The mobile terminal of claim 12, wherein some of the n number of blocks each comprise a same number of rows of the sensors.

* * * * *

UNITED STATES PATENT AND TRADEMARK OFFICE
CERTIFICATE OF CORRECTION

| | |
|---|---|
| PATENT NO. | : 10,984,215 B2 |
| APPLICATION NO. | : 16/492170 |
| DATED | : April 20, 2021 |
| INVENTOR(S) | : Zhou Zhang |

It is certified that error appears in the above-identified patent and that said Letters Patent is hereby corrected as shown below:

On the Title Page

Column 1, item (30) should be added as follows:
Foreign Application Priority Data
March. 27, 2019 (CN) ........................... 201910239530.4

Signed and Sealed this
Twenty-third Day of August, 2022

Katherine Kelly Vidal
*Director of the United States Patent and Trademark Office*